(12) United States Patent
Kim et al.

(10) Patent No.: US 11,296,344 B2
(45) Date of Patent: Apr. 5, 2022

(54) OPERATING CONTROL METHOD AND CONTROL SYSTEM OF FUEL CELL STACK

(71) Applicants: Hyundai Motor Company, Seoul (KR); Kia Motors Corporation, Seoul (KR)

(72) Inventors: Dae Jong Kim, Gyeonggi-do (KR); Hyun Suk Choo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 104 days.

(21) Appl. No.: 16/574,751

(22) Filed: Sep. 18, 2019

(65) Prior Publication Data

US 2020/0303752 A1  Sep. 24, 2020

(30) Foreign Application Priority Data

Mar. 18, 2019  (KR) .................. 10-2019-0030452

(51) Int. Cl.
*H01M 8/04537* (2016.01)
*H01M 8/04223* (2016.01)
*H01M 8/04955* (2016.01)
*H01M 8/04664* (2016.01)
*H01M 8/04992* (2016.01)

(52) U.S. Cl.
CPC ... *H01M 8/04559* (2013.01); *H01M 8/04223* (2013.01); *H01M 8/04567* (2013.01); *H01M 8/04589* (2013.01); *H01M 8/04679* (2013.01); *H01M 8/04955* (2013.01); *H01M 8/04992* (2013.01)

(58) Field of Classification Search
CPC ......... H01M 8/04559; H01M 8/04223; H01M 8/04567; H01M 8/04589; H01M 8/04679; H01M 8/04955; H01M 8/04992
See application file for complete search history.

(56) References Cited

U.S. PATENT DOCUMENTS

| | | | |
|---|---|---|---|
| 2012/0183873 A1* | 7/2012 | Matsusue | H01M 8/04059 429/431 |
| 2014/0335433 A1* | 11/2014 | Jomori | H01M 8/04238 429/432 |
| 2015/0111122 A1* | 4/2015 | Matsusue | H01M 8/04589 429/432 |
| 2015/0372329 A1* | 12/2015 | Jomori | B60L 3/0053 429/432 |
| 2018/0034077 A1* | 2/2018 | Berg | H01M 8/04298 |
| 2018/0097245 A1* | 4/2018 | Matsusue | B60L 58/40 |

FOREIGN PATENT DOCUMENTS

KR  101887770 B1  8/2018

* cited by examiner

*Primary Examiner* — Matthew J Merkling
(74) *Attorney, Agent, or Firm* — Mintz Levin Cohn Ferris Glovsky and Popeo, P.C.; Peter F. Corless

(57) ABSTRACT

An operating control method of a fuel cell stack is provide. The method includes diagnosing performance of a fuel cell stack based on an output current of the fuel cell stack, when an operating voltage of the fuel cell stack is within a predetermined diagnostic voltage range. Whether a recovery operation of the fuel cell stack is required is determined based on the diagnosed performance of the fuel cell stack and the voltage of the fuel cell stack is reduced, when the recovery operation of the fuel cell stack is required to recover performance of the fuel cell stack.

11 Claims, 8 Drawing Sheets

OPERATING CONTROL METHOD AND CONTROL SYSTEM OF FUEL CELL STACK

CROSS REFERENCE TO RELATED APPLICATION

The present application claims priority of Korean Patent Application No. 10-2019-0030452 filed Mar. 18, 2019, the entire contents of which is incorporated herein for all purposes by this reference.

BACKGROUND

Field of the Disclosure

The present disclosure relates to an operating control method and control system of a fuel cell stack, and more particularly, to an operating control, which diagnoses a state of a fuel cell stack through an output current in a state where the voltage of the fuel cell stack has been fixed, and recovers the fuel cell stack according to the diagnosed state.

Description of the Related Art

A fuel cell converts chemical energy into electrical energy using the oxidation-reduction reaction of hydrogen and oxygen supplied from a hydrogen supply device and an air supply device, respectively, and includes a fuel cell stack for producing electrical energy, a cooling system for cooling it, and the like. In other words, hydrogen is supplied to the anode side of the fuel cell stack, and the oxidation reaction of hydrogen is performed at the anode to generate hydrogen ions (Proton) and electrons, and the hydrogen ions and electrons generated move to the cathode through an electrolyte membrane and a separator, respectively. In the cathode, water is generated through an electrochemical reaction in which hydrogen ions and electrons moved from the anode and oxygen in the air participate, and electric energy is generated from the flow of electrons.

The durability of the fuel cell stack deteriorates due to damage to the catalyst contained in the fuel cell stack when exposed to a high voltage close to an open circuit voltage (OCV). A fuel cell-battery hybrid type, which uses a fuel cell and a high-voltage battery that charges and discharges the power output from the fuel cell, generally uses a high-voltage battery having a low capacity according to the limitations of a space or a weight, etc., and therefore, much of the power required by the motor is covered by the fuel cell. Particularly, the high-voltage battery has the maximum output capable of charging or discharging at a minimal level compared to the maximum output of the fuel cell, and is used for assisting an output at start-up of a fuel cell vehicle or for recovering regenerative braking energy at braking.

Therefore, when the upper limit voltage of the fuel cell stack is limited, there is a limitation in charging the high-voltage battery with the surplus output of the fuel cell stack, causing a restriction in adjusting the upper limit voltage of the fuel cell stack. In addition, when the upper limit voltage of the fuel cell stack is limited, there is a limitation to the output of the high-voltage battery for assisting the output of the fuel cell, causing a restriction in adjusting the lower limit voltage of the fuel cell stack.

In other words, it may be difficult to adjust the operating voltage of the fuel cell stack and the frequency of exposing the fuel cell stack to a high voltage is high. Accordingly, as a commercial vehicle such as a bus, a truck, or a train, in which the fuel cell stack is required to have a high durability performance compared to a general passenger vehicle, the fuel cell-battery hybrid type, which includes a high-voltage battery having low limitation to the space or the weight of the high-voltage battery and a large capacity, is being developed.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a technology for diagnosing deterioration during operation of a fuel cell stack, and recovering the fuel cell stack during operation of the fuel cell stack.

An operating control method of a fuel cell stack according to the present disclosure for achieving the object may include diagnosing performance of a fuel cell stack based on an output current of the fuel cell stack, when an operating voltage of the fuel cell stack is included in a predetermined diagnostic voltage range; determining whether a recovery operation of the fuel cell stack is required based on the diagnosed performance of the fuel cell stack; and operating to recover the performance of the fuel cell stack by reducing the voltage of the fuel cell stack, when the recovery operation of the fuel cell stack is required.

The operating control method of the fuel cell stack can further include adjusting the operating voltage of the fuel cell stack at a predetermined fixed voltage included in the diagnostic voltage range, before the diagnosing the performance of the fuel cell stack. In particular, the operating voltage of the fuel cell stack may be adjusted to the fixed voltage when an operating time that operates the fuel cell stack is equal to or greater than a predetermined reference time from the time point of diagnosing the performance of the fuel cell stack.

The predetermined diagnostic voltage range may be predetermined to include the boundary point of the voltage at which the oxidation reaction and the reduction reaction of a catalyst contained inside the fuel cell stack occur at the same level as each other. The diagnosing the performance of the fuel cell stack may calculate an average output current value of the fuel cell stack during a predetermined diagnostic time in the predetermined diagnostic voltage range, and diagnose that the performance of the fuel cell stack has been reduced as the calculated average output current value is reduced.

The determining of whether the recovery operation of the fuel cell stack is required may include determining that the recovery operation of the fuel cell stack is required when the calculated average output current value is less than A1 times predetermined reference current. Additionally, the determining of whether the recovery operation of the fuel cell stack is required may include determining that a first recovery operation of the fuel cell stack is required when the calculated average output current value is less than A1 times predetermined reference current and equal to or greater than A2 times, and determine that a second recovery operation is required thereof when the calculated average output current value is less than A2 times the predetermined reference current.

When the first recovery operation is required, the voltage of the fuel cell stack may be reduced to a recovery voltage, which is the minimum voltage capable of supplying the output of the fuel cell stack to a driving system or a high-voltage battery. When the first recovery operation is required, an air supply system may be operated to minimize the flow rate of air supplied to the fuel cell stack.

When the second recovery operation is required, the air supply system may be operated to block the air supplied to the fuel cell stack, and the voltage of the fuel cell stack may be reduced to a predetermined reduction voltage or less to thus reduce the catalyst contained inside the fuel cell stack. When the second recovery operation is required, the method may include blocking a relay for connecting the fuel cell stack to a driving system or a high-voltage battery, and exhausting the voltage of the fuel cell stack by connecting the fuel cell stack to a resistor.

The method may further include determining whether the charged amount of a high-voltage battery connected with the fuel cell stack and a driving system is equal to or greater than a predetermined charge amount. The performance of the fuel cell stack may be recovered only when the charged amount of the high-voltage battery is equal to or greater than the predetermined charge amount.

An operating control system of a fuel cell stack according to the present disclosure for achieving the object may include a fuel cell stack configured to receive hydrogen and oxygen to generate power through the reaction therebetween, and supply the generated power to a driving system or a high-voltage battery; a stack diagnostic unit configured to diagnose performance of the fuel cell stack based on an output current of the fuel cell stack, when an operating voltage of the fuel cell stack is included in a predetermined diagnostic voltage range, and determine whether a recovery operation of the fuel cell stack is required based on the diagnosed performance of the fuel cell stack; and a recovery controller configured to reduce the voltage of the fuel cell stack, when the recovery operation of the fuel cell stack is required from the stack diagnostic unit.

In particular, the recovery controller may be configured to adjust the operating voltage of the fuel cell stack at a predetermined fixed voltage included in the diagnostic voltage range, when an operating time that operates the fuel cell stack is equal to or greater than a predetermined reference time from the time point of diagnosing the performance of the fuel cell stack. The stack diagnostic unit may be configured to calculate an average output current value of the fuel cell stack during a predetermined diagnostic time in the predetermined diagnostic voltage range, determine that a first recovery operation is required when the calculated average output current value is less than A1 times predetermined reference current and equal to or greater than A2 times, and determine that a second recovery operation is required when the calculated average output current value is less than A2 times the predetermined reference current.

When the first recovery operation is required, the recover control unit may be configured to reduce the voltage of the fuel cell stack to a recovery voltage, which is the minimum voltage capable of supplying the output of the fuel cell stack to a driving system or a high-voltage battery. When the second recovery operation is required, the recovery controller may be configured to operate an air supply system to block the air supplied to the fuel cell stack, and reduce the voltage of the fuel cell stack to a predetermined reduction voltage or less to reduce a catalyst contained inside the fuel cell stack.

The operating control system of the fuel cell stack may further include a battery controller configured to monitor the charged amount of a high-voltage battery connected to the fuel cell stack and a driving system, and the recovery controller may be configured to determine whether the charged amount of the high-voltage battery monitored by the battery controller is equal to or greater than a predetermined charge amount. The performance of the fuel cell stack may be recovered only when the charged amount of the high-voltage battery is equal to or greater than the predetermined charge amount.

According to the operating control method and control system of the fuel cell stack of the present disclosure, it may be possible for the high-voltage battery to cover the fluctuation of the load, and monitor the output current of the fuel cell stack fluctuated while operating the voltage of the fuel cell stack at the fixed voltage even when the load of the vehicle is fluctuated, thereby sensing the performance change of the fuel cell stack. In addition, it may be possible to apply the recovery operation of the fuel cell stack according to the sensed performance change of the fuel cell stack to prevent the additional deterioration, thereby enhancing the durability, and to operate so that the fuel cell stack maintains high performance, thereby improving the actual traveling fuel efficiency.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
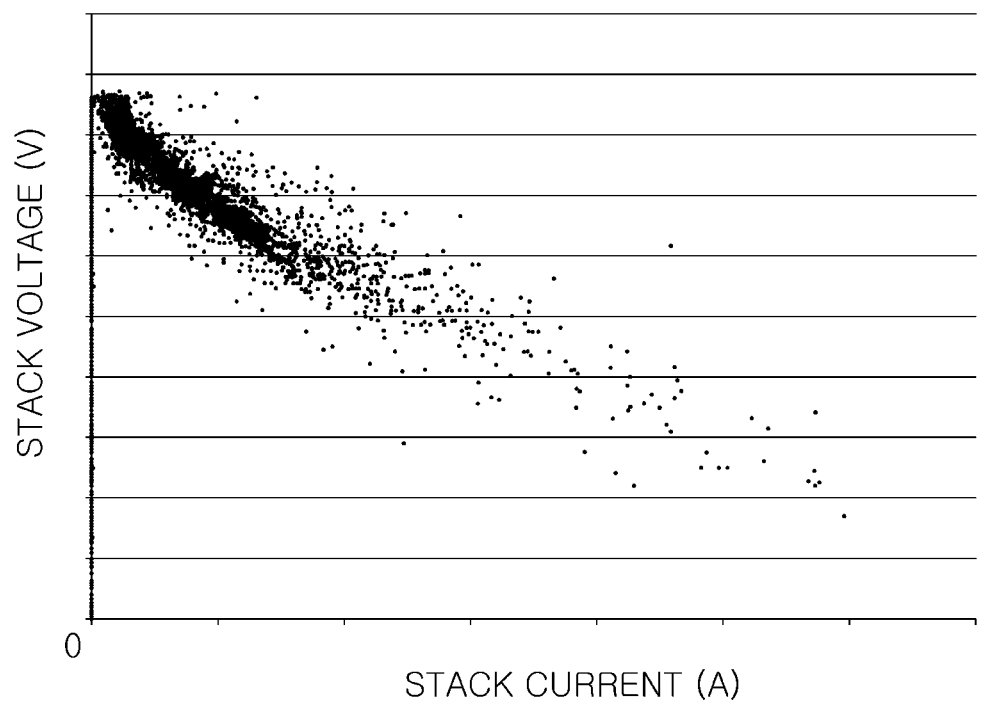
FIG. 1 is a diagram illustrating an operating point of a fuel cell stack included in a fuel cell-battery hybrid system according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural and functional descriptions of the exemplary embodiments of the present disclosure disclosed in the specification or application are only for the purpose of illustrating the embodiments of the present disclosure, and the exemplary embodiments in accordance with the present disclosure can be embodied in various forms and should not be construed as limited to the exemplary embodiments set forth in the specification or application. Various modifications and various forms can be made in the exemplary embodiments according to the present disclosure, so that specific embodiments are illustrated in the drawings and described in detail in the specification or application. It should be understood, however, that it is not intended to limit the exemplary embodiments in accordance with the concepts of the present disclosure to the particular disclosed forms, but includes all modifications, equivalents, and alternatives falling within the sprit and technical scope of the present disclosure.

The terms "first" and/or "second," and the like can be used to illustrate various components, but the components should not be limited by the terms. The terms are used to differentiate one element from another, for example, a first component may be referred to as a second component, and similarly, the second component may be also referred to as the first component without departing from claims in accordance with the concepts of the present disclosure. It will be understood that when an element is referred to as being "connected" or "coupled" to another element, it can be "directly connected" or "coupled" to the other element, but also to the other element with other elements interposed therebetween. On the other hand, it should be understood that any configuration element has no other element in between the time stated that "directly connected" or "directly coupled" to another element. Other expressions that describe the relationship between elements, such as "between" and "directly between" or "adjacent to" and "directly adjacent to" should be interpreted as well.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the specification.

Hereinafter, preferred embodiments of the present disclosure will be described in detail with reference to the accompanying drawings. The same reference numerals in each drawing denote the same members.

FIG. 1 is a diagram illustrating the operating point of a fuel cell stack included in a fuel cell-battery hybrid system according to the related art. Referring to FIG. 1, in a general fuel cell-battery hybrid system, the load of a vehicle is covered by the fuel cell and a battery is used as an assist concept, such that the operating point of the fuel cell stack is changed from time to time.

Particularly, in the general fuel cell-battery hybrid system, the output of the high-voltage battery is only 30 to 40% of the maximum output of the fuel cell, and the maximum output of the driving system (motor, inverter, etc.) is 120 to 140% of the maximum output of the fuel cell. Since the high-voltage battery is used for assistance at start-up and recovery of regenerative braking energy at braking, the charge and discharge output is relatively small compared to the fuel cell, and the storable energy capacity is also small. In other words, since the maximum output of the high-voltage battery is a minimal level compared to the maximum outputs of the driving system and the fuel cell, the required output of the driving system is mostly covered by the fuel cell, and thus, the relationship between the voltage and the current of the fuel cell stack during operation of the vehicle is distributed with a considerably wide width.

Therefore, it may be difficult to diagnose a state of the fuel cell stack, and it is necessary to use a statistical/probabilistic approach based on data accumulation. However, these methods are unable to guarantee the responsive speed or the accuracy. However, the field of commercial vehicles such as buses, trucks, and trains requires the fuel cell stack of a longer durability performance, and has less space and weight limitations than passenger vehicle, thereby applying a high capacity battery compared to the passenger vehicle for enhancing the durability of the fuel cell stack. In other words, the present disclosure is applied to a system to which a relatively high capacity battery is applied compared to the fuel cell, and may be applied to a plug-in system capable of traveling a considerable distance with only the high-voltage battery without the operation of the fuel cell stack or to the fuel cell-battery hybrid system including the high-voltage battery that charges using the fuel cell stack.

Figure 2:
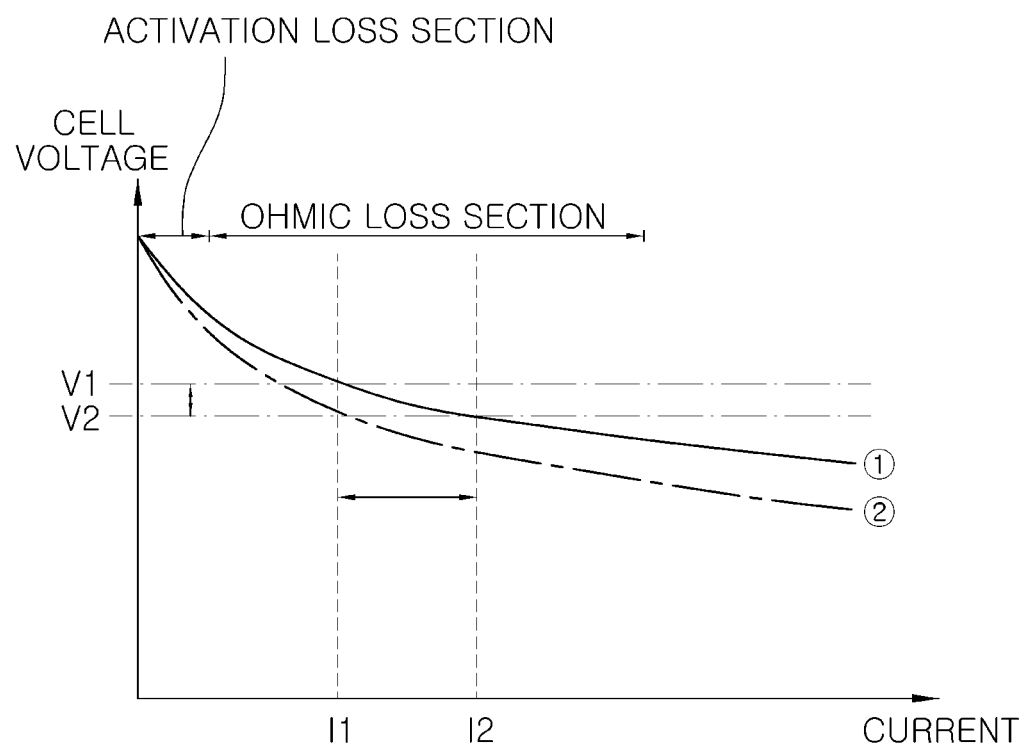
FIG. 2 is a diagram illustrating a performance curve (I-V curve) of the fuel cell stack according to the related art.

FIG. 2 is a diagram illustrating a performance curve (I-V CURVE) of the fuel cell stack according to the related art. Referring to FIG. 2, since the operating point of the fuel cell stack is continuously changed, and therefore, the performance distribution of the fuel cell stack is manifested variably, it may be difficult to diagnose the state of the fuel cell stack. However, if the voltage or the current of the fuel cell stack is fixed, it may be easier to diagnose the state of the fuel cell stack through remaining factors that are not fixed. Although the general fuel cell-battery hybrid system is difficult to fix the voltage or the current of the fuel cell stack, an operation of a fixed voltage or a fixed current is possible when the high-capacity battery such as the present disclosure is included therein.

Particularly, to cause hydrogen oxidation reaction at a fuel electrode and oxygen reduction reaction at an air electrode, the voltage change amount is minimal based on a change in the current in an Ohmic Loss section where the voltage reduces in the form of a linear function with a constant slope as the current increases after an Activation Loss section where the voltage loss is dominant. In other words, when the performance of the fuel cell stack is changed (①→②), it may be difficult to distinguish the voltage reduction amount (V2−V1) from the same current I1, but when the voltage is fixed at V2, the current reduction amount (I2−I1) is substantial. In addition, it may be difficult to controllably fix the current of the fuel cell stack. Therefore, it is advantageous to detect a change in the current while operating by fixing the voltage of the fuel cell stack in terms of discrimination.

Figure 3:
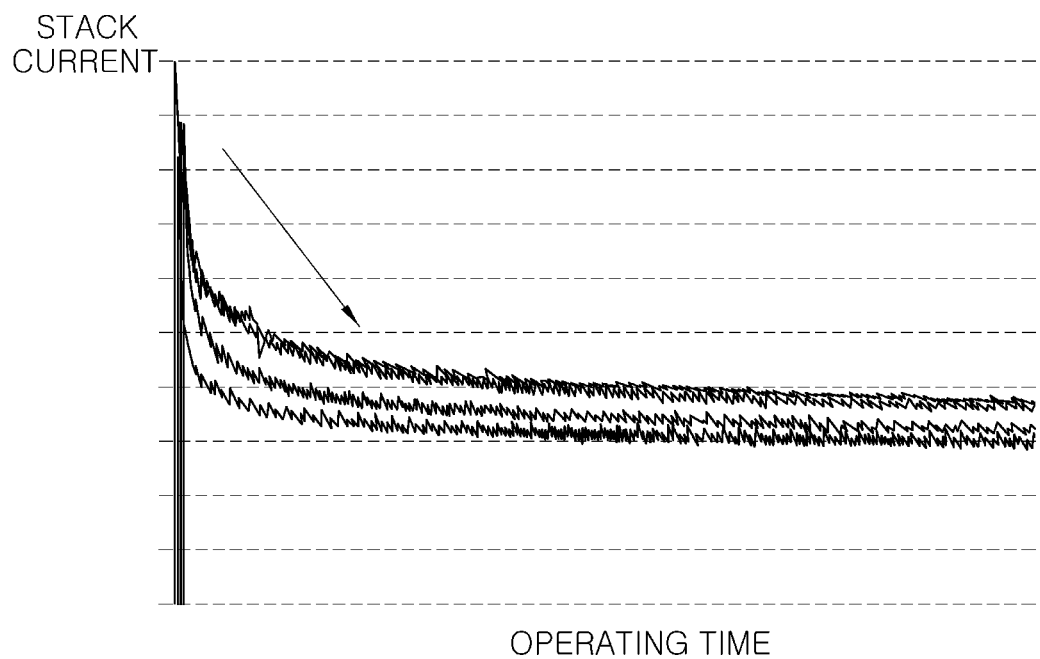
FIG. 3 is a diagram illustrating a change in an output current with time at a fixed voltage operation of the fuel cell stack according to an exemplary embodiment of the present disclosure.

FIG. 3 is a diagram illustrating a change in the output current with time at a fixed voltage operation of the fuel cell stack according to an exemplary embodiment of the present disclosure. Referring to FIG. 3, in a state of normally supplying air and hydrogen, when the stack voltage is fixed at a certain voltage, it is normal that the current is constantly output. However, when the stack is operated at a fixed voltage, the output current of the fuel cell stack gradually reduces with time.

Particularly, when the operating point (e.g., stack voltage, air supply pressure, hydrogen supply pressure, etc.) of the fuel cell stack is maintained for a substantial period of time without change, the output current output from the fuel cell stack gradually reduces. This is presumably caused by a change in the surface state of the catalyst or the electrode inside the fuel cell stack. It has been known that an oxide film is formed on the surface of the catalyst while the oxidization reaction is continuously dominant in the catalysts contained in the fuel cell stack, thereby deteriorating the performance of the fuel cell stack. To improve the durability of the fuel cell stack, the fuel cell stack may be operated at the fixed voltage, but it may be resultantly operated at low performance when operated at the fixed voltage for a substantial period of time. Therefore, an operation is required to sense the deterioration of the performance of the fuel cell stack and to recover the performance thereof.

Figure 4:
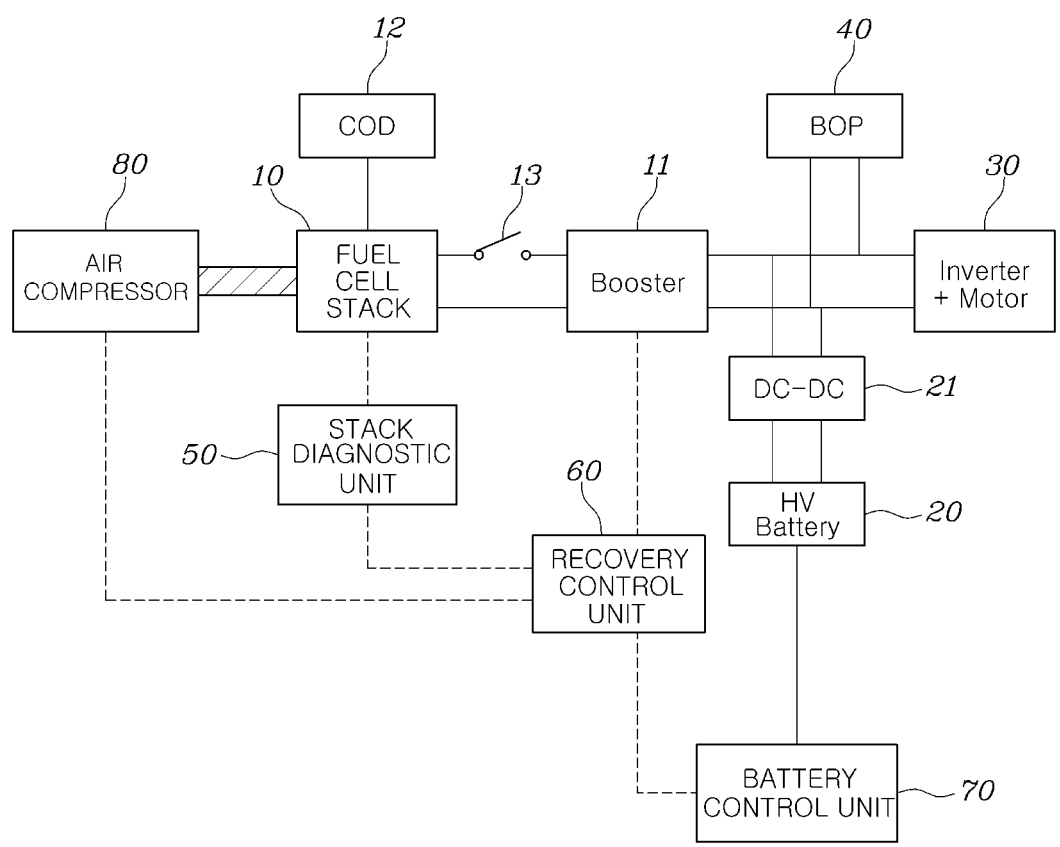
FIG. 4 is a block diagram illustrating a configuration of an operating control system of the fuel cell stack according to an exemplary embodiment of the present disclosure.

FIG. 4 is a block diagram illustrating a configuration of the operating control system of the fuel cell stack 10 according to an exemplary embodiment of the present disclosure. Referring to FIG. 4, the operating control system of the fuel cell stack 10 according to an exemplary embodiment of the present disclosure may include the fuel cell stack 10 configured to receive hydrogen and oxygen to generate power through the reaction therebetween, and supply the generated power to a driving system 30 or a high-voltage battery 20 to the fuel cell stack 10; a stack diagnostic unit 50 configured to diagnose the performance of the fuel cell stack 10 based on the output current of the fuel cell stack 10, and determine whether the recovery operation of the fuel cell stack 10 is required based on the diagnosed performance of the fuel cell stack 10, when the operating voltage of the fuel cell stack 10 is included in a predetermined diagnostic voltage range; and a recovery controller 60 configured to recover the performance of the fuel cell stack 10 by reducing the voltage of the fuel cell stack 10 when the recovery operation of the fuel cell stack 10 is required from the stack diagnostic unit 50.

In particular, the fuel cell stack 10 may be configured to receive hydrogen from a hydrogen supply system, receive air from an air supply system 80 to generate power through the reaction between oxygen and hydrogen in the air. The air supply system 80 may include an air compressor 80. In addition, the power generated by the fuel cell stack 10 may be supplied to the driving system 30 to operate the driving system 30, or supplied to the high-voltage battery 20 to charge the high-voltage battery 20.

The operating control system of the fuel cell stack 10 according to an exemplary embodiment of the present disclosure may further include a battery controller 70 configured to monitor a charged amount of the high-voltage battery 20 connected with the fuel cell stack 10 and the driving system 30. The high-voltage battery 20 may be connected with the fuel cell stack 10 and the driving system 30 via a converter 21 to execute the charge and discharge of the high-voltage battery 20. The battery controller 70 may be a battery management system (BMS), and may be configured to execute the charge and discharge of the high-voltage battery 20 by operating the converter 21 while monitoring the charged amount of the high-voltage battery 20 to adjust the charge and discharge of the high-voltage battery 20.

Herein, the high-voltage battery 20 may be a high capacity battery, the discharge output may be about 70% or more of the maximum output of the driving system 30, and the charge output may be about 70% or more of the maximum output of the fuel cell stack 10. In addition, the maximum charge amount of the battery may be charged to the amount of power that allows to the vehicle to be driven 20 [km] or more based on an average electricity efficiency (fuel efficiency). By using such a high capacity battery as the high-voltage battery 20, a change in the required output of the driving system 30 may be covered by the high-voltage battery 20, and the surplus output of the fuel cell stack 10 may be charged into the high-voltage battery 20. Therefore, it may be possible to reduce the output fluctuation of the fuel cell stack 10.

The stack diagnostic unit 50 may be configured to diagnose the performance of the fuel cell stack 10 based on the output current of the fuel cell stack 10. Specifically, as described later, a predetermined reference current may be used. The predetermined reference current may be predetermined to the output current of the fuel cell stack 10 when operated at a fixed voltage in the initial state of the fuel cell stack 10. The recovery controller 60 may be configured to recover the performance of the fuel cell stack 10 by reducing the voltage of the fuel cell stack 10 when the recovery operation of the fuel cell stack 10 is required. Particularly, the recovery controller 60 may be configured to adjust the voltage of the fuel cell stack 10 by operating a booster 11 connected to the fuel cell stack 10.

The stack diagnostic unit 50, the recovery controller 60, and the battery controller 70 according to an exemplary embodiment of the present disclosure may be implemented by a non-volatile memory (not illustrated) configured to store data on an algorithm configured to execute an operation of various components of the vehicle or a software command for playing the algorithm and a processor (not illustrated) configured to perform the operation described below using the data stored in the non-volatile memory. Herein, the memory and the processor may be implemented as separate chips. Alternatively, the memory and the processor may be implemented as a single chip integrated with each other. The processor may be the form of one or more processors.

Figure 5:
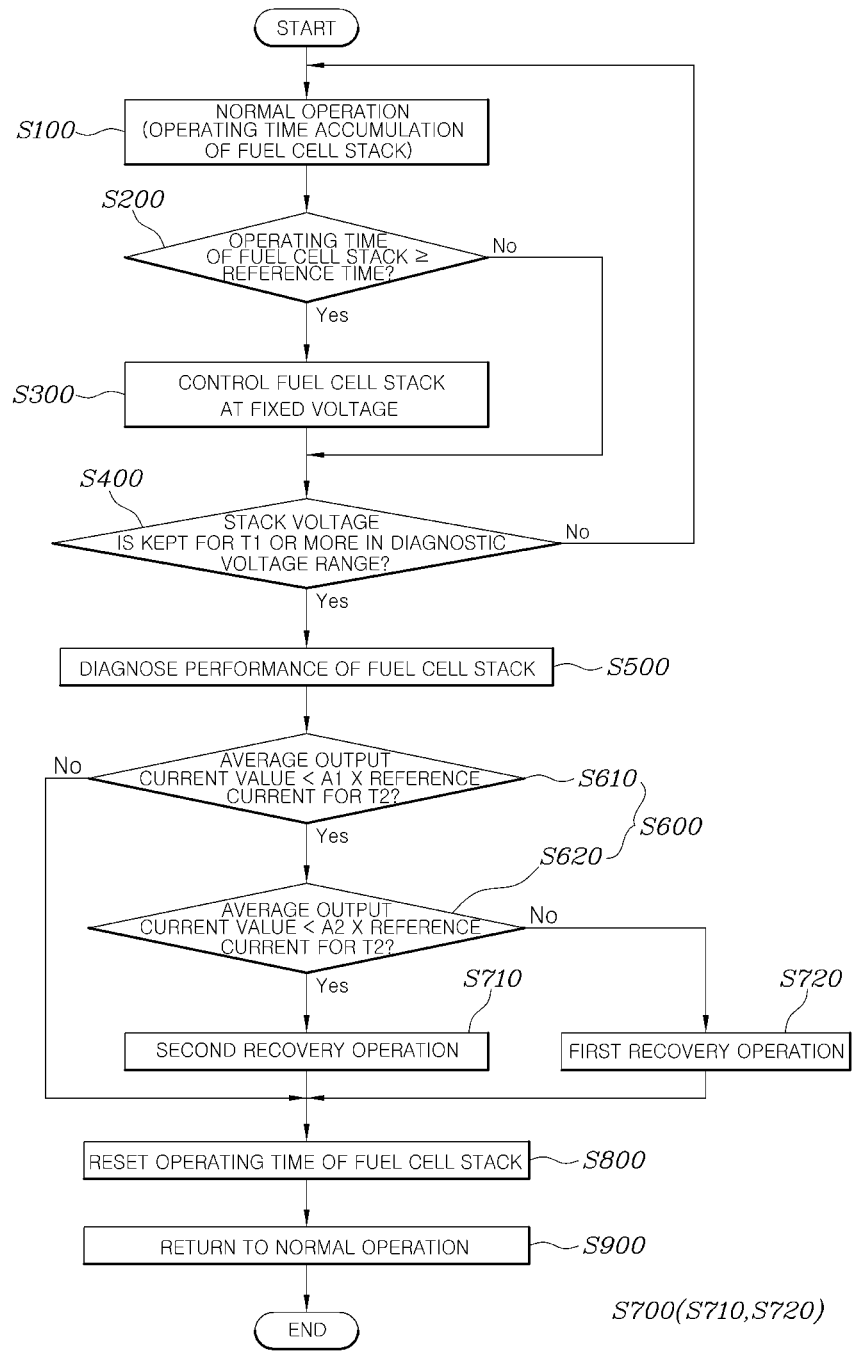
FIG. 5 is a flowchart of an operating control method of the fuel cell stack according to an exemplary embodiment of the present disclosure.

FIG. 5 is a flowchart of an operating control method of the fuel cell stack 10 according to an exemplary embodiment of the present disclosure. The method described herein below may be executed by an overall controller. Further, referring to FIG. 5, the operating control method of the fuel cell stack 10 according to an exemplary embodiment of the present disclosure may include diagnosing the performance of the fuel cell stack 10 based on the output current of the fuel cell stack 10, when the operating voltage of the fuel cell stack 10 is included in the predetermined diagnostic voltage range S400 S500; determining whether the recovery operation of the fuel cell stack 10 is required based on the diagnosed performance of the fuel cell stack 10 S600, and recovering the performance of the fuel cell stack 10 by reducing the voltage of the fuel cell stack 10, when the recovery operation of the fuel cell stack 10 is required S700.

Therefore, it may be possible to diagnose the performance of the fuel cell stack 10 more easily by using the output current in a state where the operating voltage of the fuel cell stack 10 is regularly operated at the fixed voltage S300, and in addition, to more easily diagnose the performance of the fuel cell stack 10 by using the output current even in a state where the operating voltage of the fuel cell stack 10 is irregularly included in the predetermined diagnostic voltage range S400 S500. In addition, it may be possible to contribute the enhancement of fuel efficiency through the durability enhancement of the performance enhancement of the fuel cell stack 10 through the recovery operation that reduces the voltage of the fuel cell stack 10 according to the diagnosed performance of the fuel cell stack 10.

Generally, the fuel cell stack 10 may be operated at normal operation S100. The normal operation of the fuel cell stack 10 refers to the output required from the fuel cell stack 10 being changed as the required output of the driving system 30 or the Balance Of Plant (BOP) 40 being changed, thereby changing the operating voltage. Depending on the normal operation of the fuel cell stack 10, the operating point of the fuel cell stack 10 may be changed according to the situation. Specifically, in an exemplary embodiment, the operating voltage of the fuel cell stack 10 may be maintained at a predetermined upper limit voltage for the durability of the fuel cell stack 10 in the section where the output required from the fuel cell stack 10 is low (e.g., a stop state or a low-output traveling state, etc.)

The predetermined diagnostic voltage range may include the predetermined upper limit voltage, and the upper limit voltage may be equal to a fixed voltage described later. In particular, the performance of the fuel cell stack 10 may be diagnosed irregularly even when the predetermined reference time for diagnosing the performance of the fuel cell stack 10 is not reached by regularly controlling the fixed voltage described later. Therefore, when maintained at T1 or greater in a state where the operating voltage of the fuel cell stack 10 has been included in the diagnostic voltage range during the normal operation of the fuel cell stack 10 S400, the performance of the fuel cell stack 10 may be diagnosed even if the operating time that operates the fuel cell stack 10 is less than the predetermined reference time. For example, T1 is a time sufficient for determining the state of the fuel cell stack 10, and may be predetermined to a time in minutes or more.

In another exemplary embodiment, the operating control method of the fuel cell stack 10 according to an exemplary embodiment of the present disclosure may further include adjusting the operating voltage of the fuel cell stack 10 to be at the predetermined fixed voltage included in the diagnostic voltage range S300 before the diagnosing the performance of the fuel cell stack 10 S500. The adjustment to the predetermined fixed voltage S300 may include adjusting the operating voltage of the fuel cell stack 10 to be within the diagnostic voltage range by operating the booster 11 connected with the fuel cell stack 10.

Particularly, the operating at the fixed voltage S300 may include operating the fuel cell stack 10 at the fixed voltage when the operating time of the fuel cell stack 10 that operates the fuel cell stack 10 is equal to or greater than the predetermined reference time from the time point of the diagnosis of the performance of the fuel cell stack 10 S200. At the normal operation of the fuel cell stack 10, although the operating time that operates the fuel cell stack 10 increases, the situation where it is maintained at T1 or more in a state where the operating voltage of the fuel cell stack 10 has been included in the diagnostic voltage range is unable to occur. In particular, it may be possible to forcibly adjust the operating voltage of the fuel cell stack 10 to be within the diagnostic voltage range, thereby regularly diagnosing the performance of the fuel cell stack 10. Herein, the predetermined diagnostic voltage range may be predetermined to include the boundary point of the voltage at which the oxidation reaction and the reduction reaction of the catalyst contained inside the fuel cell stack 10 occur at the same level as each other.

Figure 6:
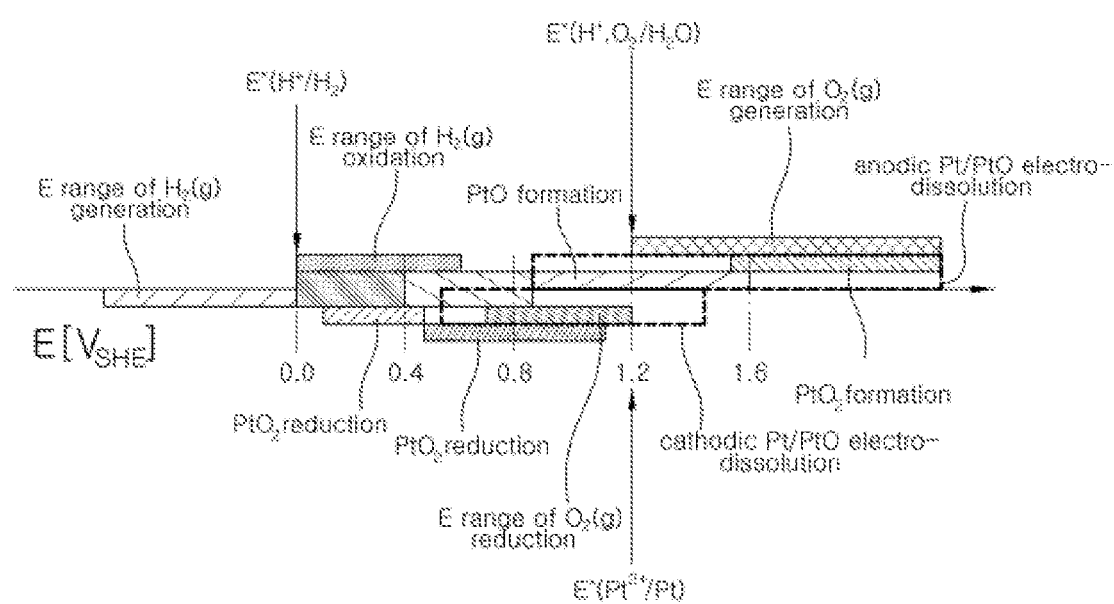
FIG. 6 is a diagram illustrating the oxidation reaction and the reduction reaction of a platinum according to a voltage of a cell included in the fuel cell stack according to an exemplary embodiment of the present disclosure.

FIG. 6 is a diagram illustrating the oxidation reaction and the reduction reaction of platinum according to a voltage of a cell included in the fuel cell stack 10. Referring to FIG. 6, platinum Pt may be used as a catalyst for promoting the reaction of hydrogen and oxygen inside the fuel cell stack 10. The oxidation reaction and the reduction reaction of platinum occur differently according to the voltage of the cell.

It has been found that as the cell voltage decreases, the reduction reaction occurs more actively, and particularly, when the cell voltage is equal to or greater than about 0.8V, the oxidation reaction of platinum occurs predominantly, and when the cell voltage is equal to or less than about 0.8V, the reduction reaction of platinum occurs dominantly. Analyzing the voltage distribution of the actual traveling vehicles applying an operating mode that maintains the cell voltage between about 0.7[V] and 1.0[V], since the average cell voltage is mostly exposed at about 0.8[V] or greater is equal to or greater than about 50% of the total section, the oxidation occurs more frequently than the reduction of platinum, and as a result, platinum reacts with hydrogen ions to occur chemical dissolution, thereby causing platinum loss.

In the present disclosure, the cell voltage, which is the boundary point of the voltage at which the oxidation reaction and the reduction reaction of the catalyst contained in the fuel cell stack 10 occur at the same level as each other, may be predetermined to about 0.8[V], and the diagnostic voltage range may be predetermined to before or after a certain range (e.g., about 0.05[V]-0.8[V]) to include the fixed voltage therein.

In, the conventional high-voltage battery 20, it has been difficult to reduce the upper limit voltage of the fuel cell stack 10 using a battery having a small maximum charge/discharge output and maximum charge amount, but the high-voltage battery 20 may cover it through the charge and discharge using the relatively high capacity battery even when the required output of the fuel cell stack 10 is changed, thereby performing the fixed voltage operation of the fuel cell stack 10. In other words, it may be possible to predetermine the upper limit voltage and the fixed voltage of the fuel cell stack 10 at the boundary point of the voltage at which the oxidation reaction and the reduction reaction of the catalyst occur at the same level as each other, thereby preventing the oxidation of the catalyst and enhancing the durability.

The diagnosing of the performance of the fuel cell stack 10 S500 may include calculating an average output current value of the fuel cell stack 10 during a predetermined diagnostic time T2 in the predetermined diagnostic voltage range, and diagnosing that the performance of the fuel cell stack 10 has been reduced as the calculated output current value is reduced. The diagnosing of the performance of the fuel cell stack 10 S500 may include diagnosing the performance of the fuel cell stack 10 based on the output current of the fuel cell stack 10, and in an exemplary embodiment, may include calculating the average output current value of the fuel cell stack 10, and diagnosing the performance of the fuel cell stack 10 using the calculated average output current value.

The diagnostic time T2 may be predetermined to a time of about 20 seconds or more, for example, and as the calculated average output current value is reduced, it may be diagnosed that the performance has been reduced by forming the oxidation film on the catalyst surface while the surface state of the catalyst or the electrode is continuously in a state where the oxidation reaction is dominant. Particularly, the determining of whether the recovery operation of the fuel cell stack 10 is required S600 may include determining that the recovery operation of the fuel cell stack 10 is required when the calculated average output current value is less than A1 times the predetermined reference current S610.

Herein, the reference current may be predetermined to the output current in a state where the operating voltage of the fuel cell stack 10 is a fixed voltage based on the initial performance of the fuel cell stack 10, and may be a reference current capable of diagnosing a change in the performance of the fuel cell stack 10.

In another exemplary embodiment, the reference current may be predetermined to reduce as a total mileage or a total traveling time of the fuel cell stack 10 increases to reflect the irreversible deterioration due to the operation of the fuel cell stack 10. More specifically, the determining of whether the recovery operation of the fuel cell stack 10 is required S600 may include determining that a first recovery operation is required when the calculated average output current value is less than A1 times the predetermined reference current and equal to or greater than A2 times, and determining that a second recovery operation is required when the calculated average output current value is less than A2 times the predetermined reference current S610, S620. Herein, A1 and A2 may be predetermined to be less than 1, and A1 may be predetermined greater than A2.

Figure 7:
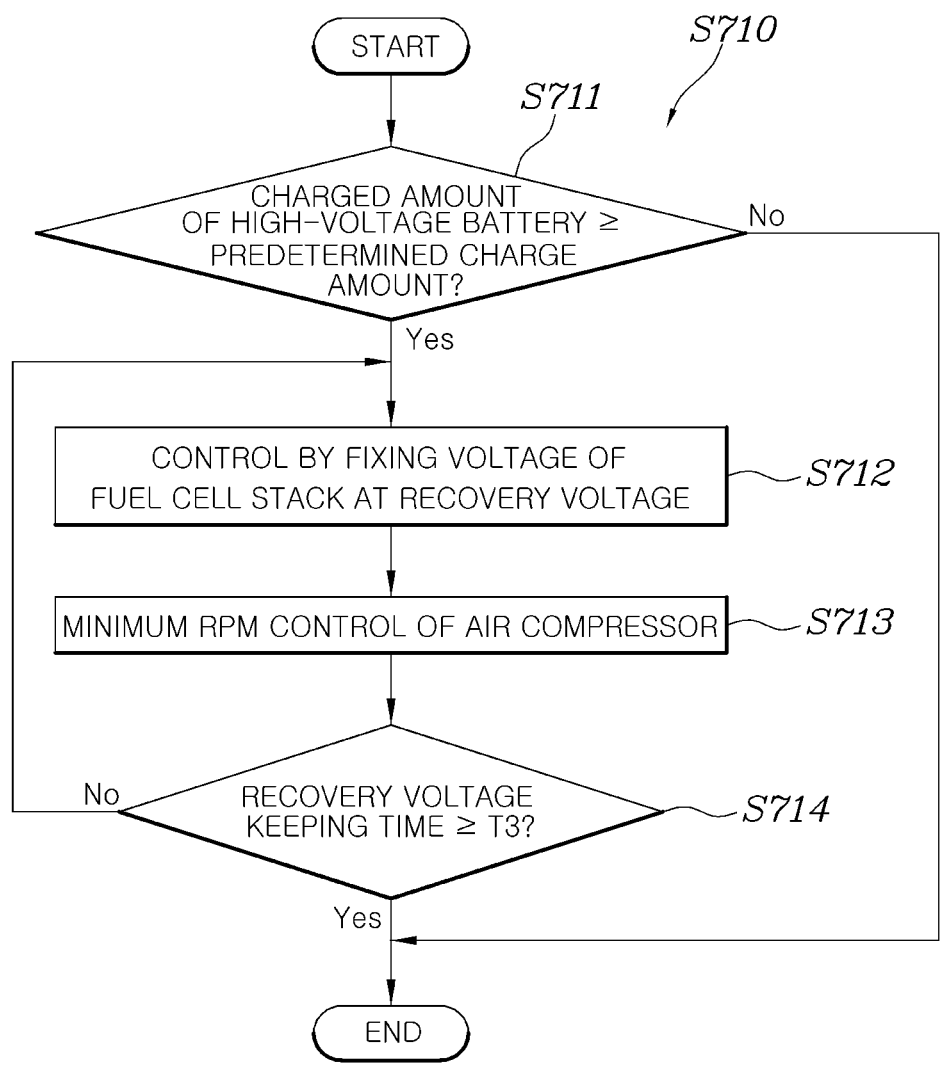
FIG. 7 is a flowchart of a first recovery operation according to an exemplary embodiment of the present disclosure.
Figure 8:
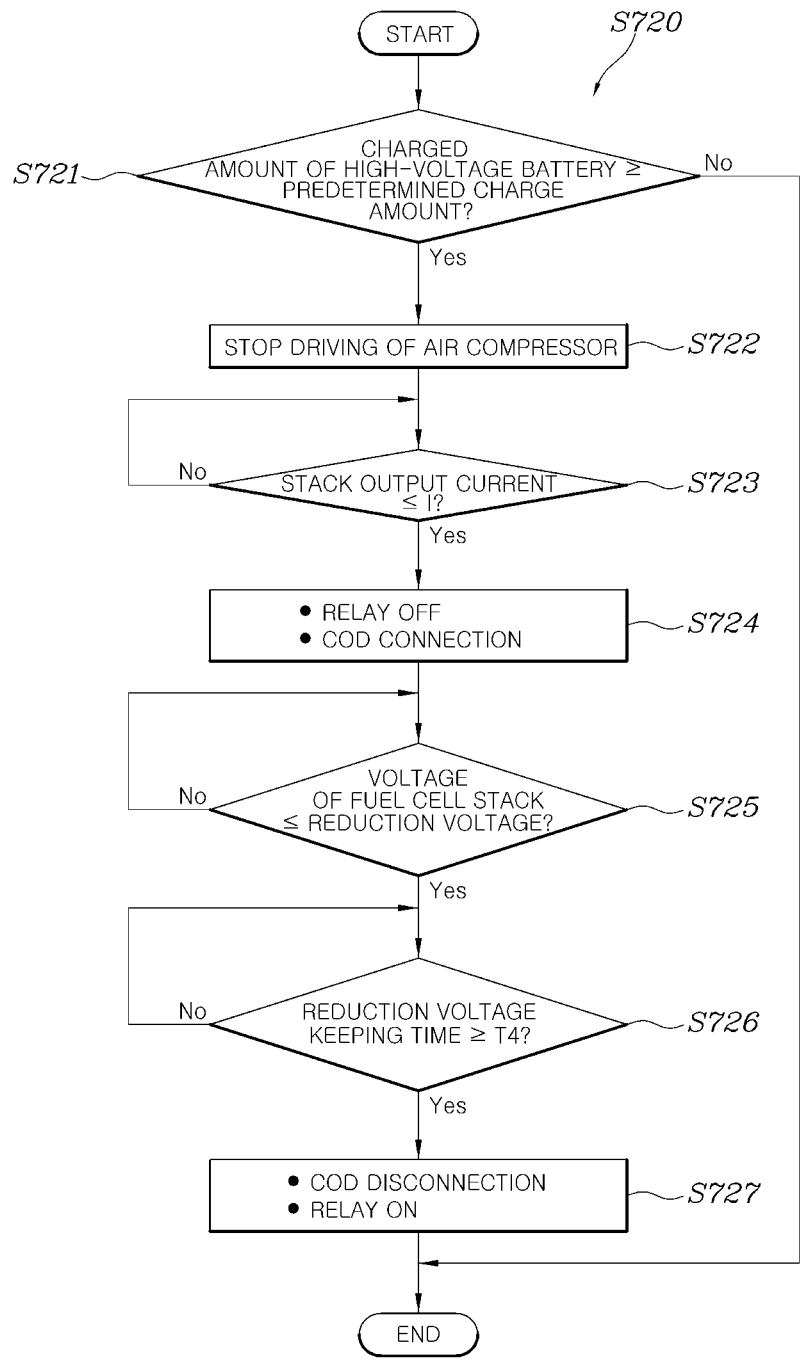
FIG. 8 is a flowchart of a second recovery operation according to an exemplary embodiment of the present disclosure.

FIG. 7 is a flowchart of a first recovery operation S710 according to an exemplary embodiment of the present disclosure, and FIG. 8 is a flowchart of a second recovery operation S720 according to an exemplary embodiment of the present disclosure. Referring to FIGS. 7 to 8, the method may further include determining whether the charged amount of the high-voltage battery 20 connected with the fuel cell stack 10 and the driving system 30 is equal to or greater than the predetermined charge amount S711, S712, and recovering the performance of the fuel cell stack 10 only when the charged amount of the high-voltage battery 20 is equal to or greater than the predetermined charge amount.

Herein, the predetermined charge amount may be predetermined to a charge amount allows the vehicle to travel a certain distance or more by driving the operating system 30 only with the output of the high-voltage battery 20 at the time of applying the average fuel efficiency. For example, the predetermined charge amount may be predetermined to the charge amount of 20 [km] or more only with the output of the high-voltage battery 20. Therefore, even when the performance of the fuel cell stack 10 is recovered by the first recovery operation or the second recovery operation of the fuel cell stack 10, it may be possible to detect whether the high-voltage battery 20 may cover the required output of the fuel cell stack 10, thereby enhancing the stability of the control.

Particularly, referring to FIG. 7, when the first recovery operation is required, the performance of the fuel cell stack 10 may be recovered S710 by reducing the voltage of the fuel cell stack 10 to the recovery voltage, which is the minimum voltage capable of supplying the output of the fuel cell stack 10 to the driving system 30 or the high-voltage battery 20 S712. The first recovery operation is an operation for recovering the fuel cell stack 10 when the performance of the fuel cell stack 10 is less reduced. Herein, the recovery voltage may be the minimum voltage capable of maintaining operation without completely stopping the fuel cell system, and may be the minimum voltage capable of supplying the output of the fuel cell stack 10 to the driving system 30 or the high-voltage battery 20 through the booster 11. Particularly, the recovery voltage may be predetermined to a cell voltage of a level of about 0.55[V], for example, to reduce PtO due to the oxidation of platinum.

In addition, when the first recovery operation is required, the performance of the fuel cell stack 10 may be recovered S710 by operating the air supply system to minimize the flow rate of air supplied to the fuel cell stack 10 S713. Particularly, the air supply system may include an air compressor, and the rotational speed of the air compressor may be adjusted to a minimum revolutions per minute (RPM). When the voltage of the fuel cell stack 10 is reduced to the recovery voltage, the output of the fuel cell stack 10 may be maintained almost at the maximum, thereby generating a surplus output. Accordingly, it may be possible to adjust the flow rate of air supplied to the fuel cell stack 10 at a minimum, thereby minimizing the output of the fuel cell stack 10.

In the first recovery operation, when the time T3 has elapsed in a state where the voltage of the fuel cell stack 10 has been maintained at the recovery voltage, the first recovery operation may be terminated S714. The T3 may be predetermined to a few minutes, for example. Specifically, referring to FIG. 8, recovering of the performance of the fuel cell stack 10 when the second recovery operation is required S720 may include operating the air supply system to block the air supplied to the fuel cell stack 10 S722, and reducing the voltage of the fuel cell stack 10 to a predetermined reduction voltage or less, which has been predetermined to thus reduce the catalyst contained inside the fuel cell stack 10 S725.

The second recovery operation is a control for recovering the performance of the fuel cell stack 10 while stopping the operation of the fuel cell stack 10 when the performance of the fuel cell stack 10 has been deteriorated substantially. Particularly, the second recovery operation recovers the reduction in the performance of the fuel cell stack 10 due to the generation of PtO and also PtO2 through the reduction reaction. Herein, the reduction voltage reduces the cell voltage of the fuel cell stack 10 to about 0.1[V], for example, and may result in the reduction of PtO2.

Particularly, when the second recovery operation is required, a relay 13 for connecting the fuel cell stack 10 to the driving system 30 or the high-voltage battery 20 may be blocked, and the voltage of the fuel cell stack 10 may be exhausted by connecting the fuel cell stack 10 to a resistor 12 S724. Since the output of the fuel cell stack 10 may be blocked from being provided to the driving system 30 or the high-voltage battery 20 when the voltage of the fuel cell stack 10 is reduced to the reduction voltage, the relay 13 for connecting the fuel cell stack 10 to the driving system 30 or the high-voltage battery 20 may be blocked, and the voltage of the fuel cell stack 10 may be exhausted by connecting to the resistor (Cathode Oxygen Depletion: COD) 12 S724.

Particularly, the relay 13 for connecting the fuel cell stack 10 to the driving system 30 or the high-voltage battery 20 may be blocked when the output current of the fuel cell stack 10 is reduced to i1 or less S723. The i1 may be predetermined to a current value capable of safely blocking the relay 13. In the second recovery operation, when the time T4 has elapsed in a state where the voltage of the fuel cell stack 10 has been maintained at the reduction voltage S725, the second recovery operation may be terminated S726. The T4 may be predetermined to about 20 seconds or more, for example.

When the second recovery operation is terminated, the connection with the resistor (COD) 12 may be blocked again, and the relay 13 for connecting the fuel cell stack 10 to the driving system 30 or the high-voltage battery 20 may be connected S727. The method may further include resetting the operating time of the fuel cell stack 10 when the first recovery operation or the second recovery operation is terminated S800, and return to the normal operation S900.

While it has been illustrated and described with respect to the exemplary embodiments of the present disclosure, it will be understood by those skilled in the art that various improvements and changes of the present disclosure may be made within the technical spirit of the present disclosure as provided by the following claims.

What is claimed is:

1. An operating control method of a fuel cell stack, comprising:
    diagnosing, by a controller, performance of a fuel cell stack based on an output current of the fuel cell stack, when an operating voltage of the fuel cell stack is within a predetermined diagnostic voltage range;
    determining, by the controller, whether a recovery operation of the fuel cell stack is required based on the diagnosed performance of the fuel cell stack; and
    recovering, by the controller, the performance of the fuel cell stack by reducing the operating voltage of the fuel cell stack, when the recovery operation of the fuel cell stack is required,
    wherein the predetermined diagnostic voltage range is predetermined to include a boundary point of the voltage at which oxidation reaction and reduction reaction of a catalyst contained inside the fuel cell stack occur at same levels as each other.

2. The operating control method of the fuel cell stack according to claim 1, further comprising:
    adjusting, by the controller, the operating voltage of the fuel cell stack to be at a predetermined fixed voltage within the predetermined diagnostic voltage range, before diagnosing the performance of the fuel cell stack.

3. The operating control method of the fuel cell stack according to claim 2, wherein the adjusting the operating voltage to be at the predetermined fixed voltage includes:
    adjusting, by the controller, the operating voltage of the fuel cell stack to be at the fixed voltage when an operating time that operates the fuel cell stack is equal to or greater than a predetermined reference time from a time point of diagnosing the performance of the fuel cell stack.

4. The operating control method of the fuel cell stack according to claim 1, wherein the diagnosing of the performance of the fuel cell stack includes:
    calculating, by the controller, an average output current value of the fuel cell stack during a predetermined diagnostic time in the predetermined diagnostic voltage range; and
    determining, by the controller, that the performance of the fuel cell stack has been reduced as the average output current value calculated by the controller is reduced.

5. The operating control method of the fuel cell stack according to claim 4, wherein the determining of whether the recovery operation of the fuel cell stack is required includes:
    determining, by the controller, that the recovery operation of the fuel cell stack is required when the calculated average output current value is less than a first multiple of predetermined reference current.

6. The operating control method of the fuel cell stack according to claim 4, wherein the determining of whether the recovery operation of the fuel cell stack is required includes:
    determining, by the controller, that a first recovery operation of the fuel cell stack is required when the calculated average output current value is less than the first multiple of predetermined reference current and equal to or greater than a second multiple of the predetermined reference current; and
    determining, by the controller, that a second recovery operation is required when the calculated average output current value is less than the second multiple of the predetermined reference current.

7. The operating control method of the fuel cell stack according to claim 6, wherein when the first recovery operation is required, the method includes:
    reducing, by the controller, the operating voltage of the fuel cell stack to be at a recovery voltage, which is a minimum voltage capable of supplying the output of the fuel cell stack to a driving system or a high-voltage battery.

8. The operating control method of the fuel cell stack according to claim 7, wherein when the first recovery operation is required, the method includes:
    operating, by the controller, an air supply system to minimize a flow rate of air supplied to the fuel cell stack.

9. The operating control method of the fuel cell stack according to claim 6, wherein when the second recovery operation is required, the method includes:
    operating, by the controller, an air supply system to block air supplied to the fuel cell stack; and reducing, by the controller, the operating voltage of the fuel cell stack to a predetermined reduction voltage or less to reduce the catalyst contained inside the fuel cell stack.

10. The operating control method of the fuel cell stack according to claim 9, wherein when the second recovery operation is required, the method includes:
blocking, by the controller, a relay for connecting the fuel cell stack to a driving system or a high-voltage battery; and
exhausting, by the controller, the operating voltage of the fuel cell stack by connecting the fuel cell stack to a resistor.

11. The operating control method of the fuel cell stack according to claim 1, further comprising:
determining, by the controller, whether a charged amount of a high-voltage battery connected with the fuel cell stack and a driving system is equal to or greater than a predetermined charge amount, wherein the performance of the fuel cell stack is recovered only when the charged amount of the high-voltage battery is equal to or greater than the predetermined charge amount.

\* \* \* \* \*